United States Patent

[11] 3,584,718

[72] Inventors Paul J Schiefer
Sherman Oaks;
James D. McFarland, Jr., Chatsworth, both of, Calif.
[21] Appl. No. 829,602
[22] Filed June 2, 1969
[45] Patented June 15, 1971
[73] Assignee Schiefer Manufacturing Company
Monterey Park, Calif.

[54] WEAR SURFACES OF CLUTCHES, FLYWHEELS AND THE LIKE
15 Claims, 3 Drawing Figs.

[52] U.S. Cl. .................................................. 192/70.14,
192/107, 117/93.1, 117/127, 117/138
[51] Int. Cl. ....................................................... F16d 13/46,
F16d 13/60
[50] Field of Search ........................................... 117/127,
138, 93.1, 105.2; 192/107, 107 M, 70.14

[56] References Cited
UNITED STATES PATENTS
| | | | |
|---|---|---|---|
| 3,191,734 | 6/1965 | Batchelor et al. | 192/107 X (M) |
| 3,213,986 | 10/1965 | Smirl | 192/107 X (M) |
| 3,410,382 | 11/1968 | Root et al. | 192/107 |

*Primary Examiner*—Alfred L. Leavitt
*Assistant Examiner*—John H. Newsome
*Attorney*—Christie, Parker & Hale

ABSTRACT: The pressure plate and flywheel of a clutch and flywheel assembly each has a wear surface defined by a coating which acts as a heat barrier to prevent excessive temperature increases in the substrate of the coatings. The coatings are of $Al_2O_3$ applied by flame plating. The coatings are characterized by their hardness of from about 700 to about 950 $VPN_{300}$, a porosity of about 2 to about 3 percent, a bond strength to each of the substrates of about 6,000 to about 9,000 p.s.i., a density of about 3.40 gm/cc., a modulus of rupture of about 20,000 p.s.i., a coefficient of thermal expansion of about 3.9 in./in./°F. $\times 10^{16}$, a thermal conductivity of from about 20 to about 40 BTU/(hr.) (ft.$^2$) (°F./in.), and an operational temperature range of from about ambient to about 1,800° F.

PATENTED JUN 15 1971
3,584,718
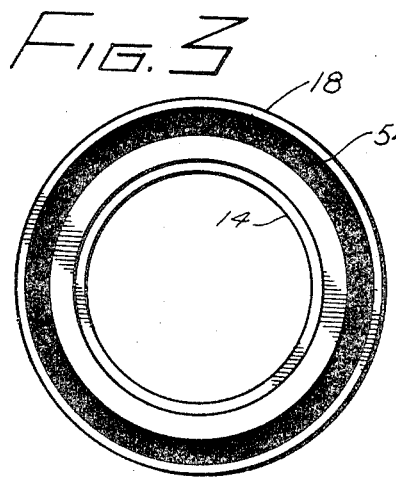
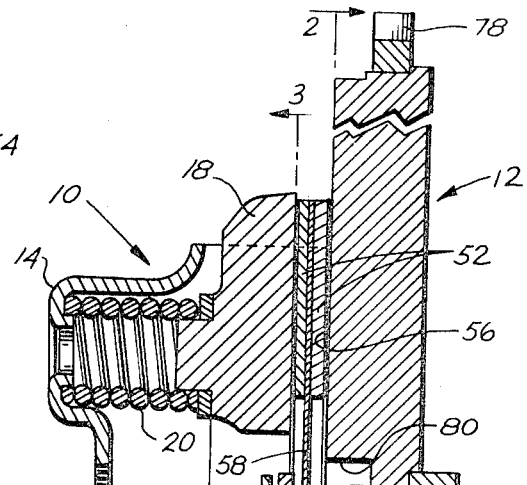
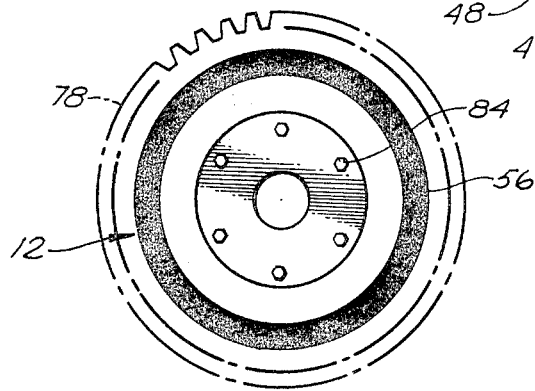
INVENTORS.
PAUL J. SCHIEFER
JAMES D. McFARLAND, JR.
BY
Christie, Parker & Hale
ATTORNEYS

WEAR SURFACES OF CLUTCHES, FLYWHEELS AND THE LIKE

BACKGROUND OF THE INVENTION

The present invention relates to clutches and flywheels in general and, more in particular, to an improved coating for the rotational, frictionally engageable surfaces of clutches and flywheels which are characterized by the fact that the coatings act as heat barriers.

In the transfer of power from a prime mover to a drive train, a clutch and flywheel are often used. The clutch has a pressure plate which forces a driven disc or clutch disc into engagement with the flywheel. When engaged, flywheel torque is transferred to the disc and from the disc to the main input shaft of the power train. When disengaged, the clutch disc is free of the flywheel and no power is transmitted from the prime mover to the drive train. Because "clutching" occurs when the flywheel and pressure plate are rotating relatively fast with respect to the clutch disc, large amounts of heat are generated when the disc is engaged. This heat results from sliding friction between the disc and the wear surfaces of the flywheel and the pressure plate.

Under severe clutching conditions, the heat generated by friction often distorts the wear surfaces of the flywheel and the pressure plate. This distortion results in loss of clutching efficiency and even permanent damage. Damage, for example, by severe heat checking is not uncommon.

Previously the art, in attempting to resolve the problem of friction-generated heat and its damaging effects on pressure plates and flywheels, has attempted to make the flywheel proper and the pressure plate proper heat sinks. These heat sinks act to drain the heat away from the wear surfaces and therefore avoid damaging distortion, heat checking and the like.

Unfortunately, however, the technique of constituting the flywheel and pressure plates as heat sinks has not always proven satisfactory. With severe clutching loads, the heat sinks cannot dissipate the heat from the wear surfaces rapidly enough to avoid damage. The problem is especially acute with pressure plates because of their limited ability to act as heat sinks.

SUMMARY OF THE INVENTION

The present invention provides wear coatings for the wear surfaces of clutches and flywheels which presents a thermal barrier to their substrates, which is wear resistant, and does not deteriorate at high temperatures. The wear surfaces are the wear surface of the pressure plate and the wear surface of the flywheel. The coatings have a high bond strength with their substrates.

In a particular form of the present invention it has been found that the use of $Al_2O_3$ as a wear surface defining coating applied by the so-called flame plating technique results in a very satisfactory thermal barrier for their substrates which augments the life of the wear surfaces and prevents thermal degradation and distortion of the substrates of the coatings.

A preferred embodiment of the present invention contemplates the use of a coating to define the wear surfaces of a pressure plate and a flywheel assembly of from about 8 to about 10 percent alpha $Al_2O_3$, about 88 percent gamma $Al_2O_3$, and from about 2 to about 4 percent beta $Al_2O_3$ applied by the flame plating technique. The coatings have a cross-sectional hardness of from about 700 to about 950 $VPN_{300}$, a bond strength of their substrates of from about 6,000 to about 9,000 p.s.i., a density of about 3.38 gm/cc., a coefficient of thermal expansion of about 3.9 in./in./°F.×10$^{16}$, and a thermal conductivity of from about 20 to about 40 BTU/(hr.)(ft.$^2$)(°F./in.) . The smoothness of the coatings is from about 60 to about 120 RMS with about 70 to about 85 RMS being preferred with a clutch disc assembly having organic or woven linings. The thickness of each coating is preferably from about 0.003 to about 0.006 inch with a circumferential deviation in thickness of no more than about 0.0005 inch, and a deviation in radial thickness of no more than about 0.001 inch.

It has been found that the hub damping of a clutch disc assembly having organic or woven linings should be more than is necessary for a clutch and flywheel assembly without the coatings of the present invention to prevent excessive heat buildup in the linings and their consequent thermal degradation. With this heat buildup, the dynamic shear loads on the coatings can produce coating failure. It is preferred, therefore, to have a hub damping of from about 0.060 to about 0.120 of an inch at about 70 foot-pounds of torque applied at about 7½ inches from the axis of rotation of the clutch disc assembly.

These and other features, aspects and advantages of the present invention will become more apparent from the following description, appended claims and drawings.

BRIEF DESCRIPTION OF THE FIGURES

FIG. 1 is an elevation, half-sectional view of a clutch and flywheel assembly of the present invention;

FIG. 2 is a view taken along line 2-2 of FIG. 1 showing the wear surface of the flywheel assembly of the present invention; and FIG. 3 is a view taken along line 3-3 of FIG. 1 showing the wear surface of the pressure plate of the present invention.

DESCRIPTION OF THE PREFERRED EMBODIMENTS

It has been found that providing a thermal barrier or dam as wear surface defining coatings in clutches and flywheels substantially eliminates distortion, thermal degradation and excessive wear of the coatings' substrates. A coating which has been found to be highly satisfactory in effecting this heat dam or barrier is $Al_2O_3$ flame-plated onto the substrates to act as the wear surfaces of the flywheel and clutch assembly.

The flame plating technique is well known. It involves the introduction of particles into a plasma in powder form. In the plasma, particles are melted and accelerated onto the substrate at a supersonic velocity. As the particles strike the substrate being coated, a high density layer is formed which is microscopically welded to the substrate. Bond strength between the coating and the substrate is exceptionally strong.

In a specific form of the present invention, it has been found that an alumina coating having from about 8 to 10 percent alpha alumina, about 88 percent gamma alumina and 2 to 4 percent beta alumina, flame-plated onto the substrates produces the desired effect. The cross-sectional hardness of the coating is from between about 700 to about 950 $VPN_{300}$. Its bond strength is between about 6,000 and 9,000 p.s.i. on steel and aluminum. The porosity of the coating is from about 2 to about 3 percent. Its modulus of rupture is 20,000 p.s.i., its modulus of elasticity is $5.7 \times 10^1$ p.s.i. The density of the coating is about 3.38 gm/cc., while its coefficient of thermal expansion is about 3.9 in./in./°F. $\times 10^1$. The thermal conductivity of the $Al_2O_3$ coating is from about 20 to about 40 BTU's/(hr.)(ft.$^2$)(°F./in.). The modulus of rupture for the coatings is 20,000 p.s.i.

The coating has very good wear resistance at ambient and operational temperatures and as a consequence it does not thermally degrade. Its operational temperature range is from ambient to about 1,800°F.

It is preferred that the smoothness of the surface of each of the coatings be between about 60 to about 120 RMS with about 70 to about 85 RMS preferred for organic lining clutch disc assembly. RMS refers to root mean square value over an area measured in microinches of deviations in height of the coating. It has been found that with too smooth a coating, say about 25 RMS, the contact between wear surfaces of the pressure plate and the flywheel assembly on the one hand and the linings of the clutch disc assembly on the other increases to an extent that the heat generated at the wear surfaces thermally degrades the linings. On the other hand, if the coating is too rough, above 120 RMS, an abrading condition exists and the linings will wear away. The thermal degradation and wear of clutch disc lining is particularly acute with organic or woven linings as opposed to sintered linings. Because of this, the surface smoothness of the coatings is more critical. It has been found that with a smoothness in the range of from about 70 to about 85 RMS, thermal degradation and wear of organic or woven linings are avoided.

It has also been found that the coatings ablate during slip of the wear surfaces. This ablation removes heat generated by slipping friction. Even though there is some sacrifice of material, it has been found that wear surfaces of clutches and flywheels of the present invention will outlive a standard, unmodified clutch and flywheel.

Preferably, the coating thickness should be between about 0.003 to about 0.006 inch. This thickness is found to give an excellent balance between disc life, frictional characteristics for transmitting power, and the desired heat dam or barrier effect. With increased coating thickness the heat barrier effect is improved, but clutch disc wear is accelerated because the wear surface temperature of the flywheel assembly and the pressure plate increases. The coating itself has a tendency to heat check with increased coating thickness because of excessive heat retention. With too thin a coating there is a loss of the heat dam effect and a tendency to lose the bond with the substrate. Coating uniformity circumferentially is preferably within about 0.005 inch, while coating uniformity radially is preferably within about 0.001 inch. These uniformities prevent hot spots in localized areas and, therefore, degradation of clutch disc linings.

With specific reference to the FIGS. of an embodiment of the invention, a clutch and flywheel assembly is illustrated. FIG. 1 illustrates a clutch assembly 10 and a flywheel assembly 12.

The clutch assembly includes a clutch cover 14 which is secured as by male fasteners 16 to the flywheel assembly. A pressure plate 18 is carried by the clutch cover through a plurality of compression springs 20 and a plurality of release fingers 22.

For the purpose of drawing clarity and because they do not constitute a part of the invention as such, only one of the compression springs is shown and only one of the release fingers is shown. It is to be understood, however, that the compression springs are disposed at regular intervals between the clutch cover and the pressure plate throughout the circumferential extent of the pressure plate. Similarly, the release fingers are disposed in a regular radial array about the axis of rotation of the clutch.

Each release finger has a leverlike arm 24 extending radially inward for actuation by a standard release bearing 26. The release bearing itself is carried on a release bearing hub 28 which in turn is capable of sliding, axial movement on a main input shaft 30 of a transmission 32. A release lever 34 is capable of engaging a face 36 of the release bearing hub to force the hub axially along the input shaft to engage the release fingers.

Each release finger is pivotally mounted to the clutch cover by way of a yoke 38 and a male fastener 40. The yoke straddles the finger and is pivotally secured thereto through a pivot pin 42. The pressure plate is cut out at 44 for movement of the release fingers.

The pressure plate is also pivotally connected to the release fingers through a pivot pin 46. The pivot pin is secured in a yoke 48 of the pressure plate. Thus, pivotal movement of the release fingers clockwise in FIG. 1 forces the pressure plate axially away from the flywheel assembly to release the clutch. Normally, however, the compression springs bear on the pressure plate to maintain the engagement of a clutch disc assembly 50 with the flywheel by the pressure plate's forcing the clutch disc assembly into engagement with the flywheel.

The clutch disc assembly itself includes a pair of annular linings 52 for frictional engagement by a wear coating 54 of pressure plate 18 and a wear coating 56 of flywheel assembly 12, respectively. These wear coatings are the coatings discussed in detail previously. The linings are secured on a marcel 58. A retaining plate 60 is coupled to the marcel with a plurality of regularly disposed, circumferential fasteners 62. A hub 64 is disposed for axial movement on the main input shaft 30. The marcel and retaining plate are capable of limited rotational movement with respect to the hub. For this purpose, the marcel and retaining plate are coupled to hub 50 through a plurality of regularly disposed compression springs 66. Each compression spring bears against an intermediate plate portion 68 of the hub at one end and against the marcel and retaining plate at the other end. Thus, when the clutch disc assembly is engaged by the flywheel, relative rotation between the linings and the hub is possible to the extent that springs 66 allow it. This cushions or softens clutch engagement.

This damping or softening effect effected by springs 66 is referred to in the art as "friction lag." Prior art clutch assemblies using this damping principle have a friction lag of 0.025 to 0.045 of an inch with 70 foot-pounds of applied torque at 7½ inches from the axis of rotation of the clutch disc assembly.

However, with the coatings of the present invention, it is preferred that a greater "cushion" be present when linings 52 are organic or woven. It has been found for the clutch and flywheel assembly of the present invention, that a rotational movement between linings 52 and hub 64 of from about 0.060 to about 0.120 of an inch with 70 foot-pounds of torque applied at 7½ inches from the axis of rotation of the clutch disc assembly prevents excessive skidding between the wear surfaces of the clutch. In short, with the coatings of the preset invention, it is desirable not to have an excessive amount of sliding friction because of its degrading effect on the linings.

Continuing with the description of the flywheel assembly, it generally includes flywheel proper 76 which may be made of 6061T6 aluminum.

A standard ring gear 78 is secured around the circumference of the flywheel. The flywheel has a recess 80 for its mounting on a crankshaft 82 of an engine. This mounting is effected through fasteners 84.

In operation, the clutch is disengaged by movement of release lever 34 axially towards flywheel assembly 12 to push release bearing 26 towards the flywheel assembly. With this movement of the release bearing, release fingers 22 pivot about pins 42 to force pressure plate assembly 18 axially away from the flywheel assembly. At this point the clutch is disengaged.

When the clutch is to be engaged again, the release lever is released permitting compression springs 20 to force pressure plate 18 against clutch disc assembly 50 and the latter into frictional engagement with flywheel assembly 12.

At this point there is usually a considerable difference in the revolution rate of the clutch disc assembly on the one hand and the flywheel assembly and pressure plate on the other. The rotating speed of the flywheel assembly and pressure plate, of course, is determined by the speed of the prime mover while the rotating speed of the clutch disc assembly is determined by the speed of the main input shaft. When engaged, therefore, there must be slippage between the clutch disc assembly and the flywheel assembly and pressure plate which generates heat.

This heat in prior art clutches is transferred into the flywheel assembly and into the pressure plate. However, with the wear coatings of the present invention, some of the heat is retained in the coatings of $Al_2O_3$ to prevent distortion from excessive heating of the flywheel assembly and the pressure plate. This prevents distortion at the wear surfaces of the two and the consequent creation of high spots wherein localized heat could cause thermal degradation and failure.

Some of the heat generated by the frictional engagement of the clutch is dissipated by ablation of the coating material.

Because the coatings have high strength at elevated temperatures, it is possible to retain the heat generated by friction in the coatings without coating degradation. And because the coatings are abrasion resistant, they do not wear excessively.

During engagement, linings 52 rotate slightly with respect to hub 64 to prevent excessive sliding contact between the linings and wear coatings 54 and 56 when the linings are woven or organic. The amount of this slight rotation is a function of the applied torque as determined by the "friction lag" previously discussed.

What we claim is:

1. In combination a clutch and flywheel assembly of the type having a selectively axially movable pressure plate for engaging a clutch disc assembly with a flywheel assembly, the pressure plate and the flywheel assembly each having a wear surface for rotational, frictional engagement with the clutch disc assembly, an improvement which comprises
   a coating of $Al_2O_3$ on each of the wear surfaces.

2. The improvement claimed in claim 1 wherein:
   each of the coatings is from about 8 to about 10 percent alpha $Al_2O_3$, about 88 percent gamma $Al_2O_3$, and from about 2 to about 4 percent beta $Al_2O_3$.

3. The improvement claimed in claim 2 wherein:
   the coatings have a cross-sectional hardness of from about 700 to about 950 $VPN_{300}$, a bond strength to the pressure plate and the flywheel assembly of from about 6,000 to about 9,000 p.s.i., a density of about 3.38 gm/cc., a coefficient of thermal expansion of about 3.9 in./in./°F.$\times 10^{16}$, and a thermal conductivity of from about 20 to about 40 BTU/(hr.)(ft.$^2$)(°F./in.).

4. The improvement claimed in claim 1 wherein:
   the smoothness of the wear surfaces is from about 60 to about 120 RMS, the coating's thickness is from about 0.003 to about 0.006 inch, the circumferential deviation in thickness of each of the coatings is no more than about 0.0005 inch, and the deviation in radial thickness is no more than about 0.001 inch.

5. The improvement claimed in claim 4 wherein:
   the clutch disc assembly is of the hub damping type having a hub damping of from about 0.060 to about 0.120 of an inch at about 70 foot-pounds of torque applied at about 7½ inches from the axis of rotation of the clutch disc assembly, the smoothness of the wear surfaces being from about 70 to about 85 RMS.

6. The improvement claimed in claim 5 wherein:
   the coatings have a cross-sectional hardness of from about 700 to about 950 $VPN_{300}$, a bond strength to the pressure plate and the flywheel assembly of from about 6,000 to about 9,000 p.s.i., a density of about 3.38 gm/cc., a coefficient of thermal expansion of about 3.9 in./in./°F.$\times 10^1$, and a thermal conductivity of from about 20 to about 40 BTU/(hr.)(ft.$^2$)(°F./in.).

7. The improvement claimed in claim 6 wherein:
   each of the coatings is from about 8 to about 10 percent alpha $Al_2O_3$, about 88 percent gamma $Al_2O_3$, and from about 2 to about 4 percent beta $Al_2O_3$.

8. In combination with a pressure plate of the type used in a clutch assembly, said pressure plate having a wear surface, an improved wear surface coating comprising $Al_2O_3$.

9. The improvement claimed in claim 8 wherein the wear coating is from about 8 to about 10 percent alpha $Al_2O_3$, about 88 percent gamma $Al_2O_3$, and from about 2 to about 4 percent beta $Al_2O_3$.

10. The improvement claimed in claim 9 wherein the wear coating has a smoothness of from about 60 to about 120 RMS, a thickness of from about 0.003 to about 0.006 inch, a circumferential deviation in thickness of no more than about 0.0005 inch, and a radial deviation in thickness of no more than about 0.001 inch.

11. The improvement claimed in claim 10 wherein:
    the wear coating has a cross-sectional hardness of from about 700 to about 950 $VPN_{300}$, a bond strength to the pressure plate of from about 6,000 to about 9,000 p.s.i., a density of about 3.38 gm/cc., a coefficient of thermal expansion of about 3.9 in./in./°F.$\times 10^{16}$, and a thermal conductivity of from about 20 to about 40 BTU/(hr.)(ft.$^2$)(°F./in.).

12. In combination with a flywheel assembly of the type used in a clutch assembly including a pressure plate having a wear surface, the improvement wherein said wear surface has a coating comprising $Al_2O_3$.

13. The improvement claimed in claim 12 wherein the wear coating is from about 8 to about 10 percent alpha $Al_2O_3$, about 88 percent gamma $Al_2O_3$, and from about 2 to about 4 percent beta $Al_2O_3$.

14. The improvement claimed in claim 13 wherein the wear coating has a smoothness of from about 60 to about 120 RMS, a thickness of from about 0.003 to about 0.006 inch, a circumferential deviation in thickness of no more than about 0.005 inch, and a radial deviation in thickness of no more than about 0.001 inch.

15. The improvement claimed in claim 15 wherein:
    the wear coating has a cross-sectional hardness of from about 700 to about 950 $VPN_{300}$, a bond strength to the pressure plate of from about 6,000 to about 9,000 p.s.i., a density of about 3.38 gm/cc., a gm/cc., thermal expansion of about 3.9 in./in./°F.$\times 10^{16}$, and a thermal conductivity of from about 20 to about 40 BTU/(hr.)(ft.$^2$)(°F./in.).

PO-1050
(5/69)

UNITED STATES PATENT OFFICE
CERTIFICATE OF CORRECTION

Patent No. __3,584,718__     Dated __June 15, 1971__

Inventor(s)___Paul J. Schiefer and James D. McFarland, Jr.___

It is certified that error appears in the above-identified patent and that said Letters Patent are hereby corrected as shown below:

In the abstract: Line 11, "$10^{16}$" should be --$10^{-6}$--.

In the specification: Column 1, line 68, "of" should be --to--; line 70, "$10^{16}$" should be --$10^{-6}$--. Column 2, line 20, "elevation" should be --elevational--; line 54, "$10^{1}$" should be --$10^{-6}$--; line 56, "$10^{1}$" should be --$10^{-6}$--. Column 4, line 7, "50" should be --64--.

In the claims: Claim 3, column 5, line 24, "$10^{16}$" should be --$10^{-6}$--. Claim 6, column 5, line 47, "$10^{1}$" should be --$10^{-6}$--. Claim 11, column 6, line 24, "$10^{16}$" should be --$10^{-6}$--; line 25, at end of line insert --)--; line 26, at beginning of line delete ")". Claim 14, column 6, line 38, "0.005" should be --0.0005--. Claim 15, column 6, line 41, "15" should be --14--; line 45, "a gm/cc" should be --a coefficient of--; line 46, "$10^{16}$" should be --$10^{-6}$--.

Signed and sealed this 13th day of June 1972.

(SEAL)
Attest:

EDWARD M. FLETCHER, JR.
Attesting Officer

ROBERT GOTTSCHALK
Commissioner of Patents